(12) United States Patent
Allan et al.

(10) Patent No.: US 8,720,226 B2
(45) Date of Patent: May 13, 2014

(54) METHODS FOR PRODUCING ION-EXCHANGEABLE GLASSES

(75) Inventors: Douglas Clippinger Allan, Corning, NY (US); Adam James Ellison, Painted Post, NY (US); John Christopher Mauro, Corning, NY (US)

(73) Assignee: Corning Incorporated, Corning, NY (US)

( * ) Notice: Subject to any disclaimer, the term of this patent is extended or adjusted under 35 U.S.C. 154(b) by 20 days.

(21) Appl. No.: 13/417,835

(22) Filed: Mar. 12, 2012

(65) Prior Publication Data

US 2013/0233020 A1     Sep. 12, 2013

(51) Int. Cl.
C03C 15/00     (2006.01)

(52) U.S. Cl.
USPC ............................. 65/30.14; 702/30

(58) Field of Classification Search
USPC ............................. 703/30; 65/30.14
See application file for complete search history.

(56) References Cited

U.S. PATENT DOCUMENTS

| | | | |
|---|---|---|---|
| 3,790,430 | A | 2/1974 | Mochel |
| 2011/0079048 | A1 | 4/2011 | Shelestak et al. |
| 2011/0281093 | A1 | 11/2011 | Gulati et al. |

FOREIGN PATENT DOCUMENTS

| | | |
|---|---|---|
| CN | 200978253 | 11/2007 |
| JP | 2004339019 A | 12/2004 |
| WO | 2010/005578 A1 | 1/2010 |
| WO | 2011/022661 A2 | 2/2011 |

OTHER PUBLICATIONS

Shen, J., Green, D.J., "Prediction of Stress Profiles in Ion Exchanged Glasses", Journal of Non-Crystalline Solids 344 (2004) 79-87.*
Johnson, J.R., bristow, R.H., Blau, H.H.,"Diffusion of Ions in some simple glasses",journal of the american Ceramic Society,vol. 34, N. 6, (1951) 165-172.*
Zhuravlev, G.G., Evstieshnenkov, V.V. Kuznetsov, A.I., Golova, E.P., "Calculatoin of Stresses in Ion-Exchange Strengthened Glass Articles", Fiz. Khim. Stekla, vol. 7, No. 4, (1981), 414-420.*
Startsev, Yu. K., Mazurin, O, and Raschet, V. "Calculations of the propoperties and stresses for ion-exchange-modified glass layers: 1 Main Concepts", Fiz. Khim. Stekla, V20, N.4, (1994), 467-487.*
Boguslayskii, I.A., Pukhlik, O.I., "calculation methods in studies of ion-exchange strengthening of sheet glass", Fiz. Khim. Stekla, vol. 5, No. 5, (1979), 577-582.*
Startsev, Yu.K.; Priven, A.I., "calculatoins of the properties and stresses for ion-exchange-modified glass layers: 2 Relaxation of a thin glass layer after abrupt compositoin changes", Fiz. Khim. Stelka, vol. 22, No. 2, (1996), 137-145.*

(Continued)

*Primary Examiner* — Jason L Lazorcik
(74) *Attorney, Agent, or Firm* — Timothy M Schaeberle

(57) ABSTRACT

Computer-implemented methods and apparatus are provided for predicting/estimating chemical depth of layer (DOL) and maximum surface compressive stress (CS) of glass articles after ion-exchange. The methods and apparatus can, for example, be used to select glass compositions, salt bath temperatures, and/or ion-exchange times which provide desired DOL and/or CS values. One or more manufacturing constraints, e.g., constraints on liquidus viscosity, zircon breakdown viscosity, and the like, can be applied to the process of predicting/estimating DOL and/or CS values so that glass compositions selected based on DOL and/or CS values can, for example, be manufactured commercially by a fusion or float process.

15 Claims, 4 Drawing Sheets

(56) References Cited

OTHER PUBLICATIONS

Startsev,Yu., Priven, A., "A new approach to calculation of property profiles of ion-exchanged glasses" Proc. Int. Conf. on science and technology of new glasses, Tokyo (1991) pp. 169-174.*

U.S. Appl. No. 12/896,355, filed Oct. 1, 2010, Titled "Methods and Apparatus for Predicting Glass Properties".

Machine Translation of CN200978253.

Machine Translation of JP2004339019.

Araujo et al; "Ion Exchange Equilibria Between Glass and Molten Salts"; Journal of Non-Crystalline Solids; 318 (2003) 262-267.

Rene GY; "Ion Exchange for Glass Strengthening"; Materials Science and Engineering B; 149 (2008) 159-165.

Sinton et al; "Variations in K+-NA+ Ion Exchange Depth in Commercial and Experimental Float Glass Compositions"; Materials Research Bulletin, vol. 34, Nos. 14/15, pp. 2351-2359, 1999.

Yu K. Startsev; "Modeling the Combined Effect of Termperature and Composition on TEH Properties of a Glass Plate"; Inorganic Materials, vol. 37, No. 6 2001 pp. 628-635.

Arun K. Varshneya; "Chemical Strengthening of Glass: Lessons Learned and Yet to Be Learned"; International Journal of Applied Glass Science; 1 [2] 131-142 (2010).

Johnson, et al. "Diffusion of Ions in Some Simple Glasses," Journal of the American Ceramic Society, 1951, 34:165-172.

Startsev et al., "Calculation of Properties and Stresses in Glass Layers Modified by Ion Exchange: I. The Basic Principles of the Model," Glass Phys Chem, 1994, 20:315-325.

Startsev et al., "Calculation of Properties and Stresses in Glass Layers Modified by Ion Exchange: II. Relaxation of Properties . . . ," Glass Phys Chem, 1996, 22:103-109.

* cited by examiner

METHODS FOR PRODUCING ION-EXCHANGEABLE GLASSES

FIELD

This disclosure relates to methods for producing ion-exchangeable glasses and, in particular, to methods for selecting batch components for use in producing such glasses. The disclosure also relates to methods for ion-exchange strengthening of glass articles, where the methods take into account the composition of the article being strengthened.

DEFINITIONS

The term "glasses" (as well as its singular form, "glass") includes both glasses and glass-ceramics.

The term "glass article" (as well as its plural form, "glass articles") is used in its broadest sense to include any object made wholly or partly of glass and/or a glass-ceramic.

BACKGROUND

Ion-exchangeable glasses are used to produce chemically-strengthened glass articles, also known as ion-strengthened glass articles. Examples of ion-strengthened glass articles include the scratch-resistant faceplates used in portable electronic devices, e.g., the faceplates made from Corning Incorporated's Gorilla® brand glass sheets. In broad overview, such articles are made by forming an ion-exchangeable glass into a desired configuration, e.g., into a glass sheet in the case of faceplates, and then subjecting the formed glass to an ion-exchange treatment, e.g., a treatment in which the formed glass is submersed in a salt bath at an elevated temperature for a predetermined period of time.

The ion-exchange treatment causes ions from the salt bath, e.g., potassium ions, to diffuse into the glass while ions from the glass, e.g., sodium ions, diffuse out of the glass. Because of their different ionic radii, this exchange of ions between the glass and the salt bath results in the formation of a compressive layer at the surface of the glass which enhances the glass's mechanical properties, e.g., its surface hardness. The effects of the ion exchange process are typically characterized in terms of two parameters: (1) the chemical depth of layer (DOL) produced by the process and (2) the final maximum surface compressive stress (CS). Values for these parameters are most conveniently determined using optical measurements, and commercial equipment is available for this purpose, e.g., the stress meters sold by Orihara Industrial Company, Ltd. As used herein, DOL and CS values are values determined using such equipment.

As discussed in detail below, because of the number of variables that come into play, the selection of batch components for producing ion-exchangeable glasses has been a complicated, challenging, time-consuming, and expensive process. Consequently, the historical brute-force approach of producing numerous glass samples having different compositions, subjecting those samples to an ion-exchange process, and then testing the resulting ion-exchanged glasses for their DOL and CS values has been severely challenged by the ever-growing demand for improved ion-strengthened glass articles.

The present disclosure addresses this existing problem in the art and provides computer-implemented models that relate at least DOL and CS to batch composition. As shown by the working examples set forth below, through use of the computer-implemented models, glass compositions have been identified which achieve desirable, commercially-valuable balances between the competing requirements for an ion-exchangeable glass composition.

SUMMARY

In accordance with a first aspect, a method is disclosed for making a glass article which includes:
  (I) melting batch materials to produce molten glass (e.g., melting batch materials using commercial, laboratory, experimental, or other glass making equipment now known or subsequently developed); and
  (II) forming a glass article from the molten glass (e.g., forming a glass article using commercial, laboratory, experimental, or other glass making equipment now known or subsequently developed);
wherein:
  (A) the batch materials comprise a plurality of components that (i) affect the ion-exchange properties of the glass and (ii) become at least part of the glass of the glass article (i.e., the ion-exchange affecting components can make up the entire glass composition or only a part of the glass composition); and
  (B) the method is characterized by said ion-exchange affecting components and/or their concentrations in the glass of the glass article being at least partially based on the combination of: (i) a first computer-implemented model which relates chemical depth of layer after ion-exchange to glass composition; and (ii) a second computer-implemented model which relates maximum surface compressive stress after ion-exchange to glass composition.

In accordance with a second aspect, a method is disclosed for making a glass article which includes:
  (I) melting batch materials to produce molten glass (e.g., melting batch materials using commercial, laboratory, experimental, or other glass making equipment now known or subsequently developed); and
  (II) forming a glass article from the molten glass (e.g., forming a glass article using commercial, laboratory, experimental, or other glass making equipment now known or subsequently developed);
wherein:
  (A) the batch materials comprise a plurality of components that (i) affect the ion-exchange properties of the glass and (ii) become at least part of the glass of the glass article (i.e., the ion-exchange affecting components can make up the entire glass composition or only a part of the glass composition); and
  (B) the method is characterized by said ion-exchange affecting components and/or their concentrations in the glass of the glass article being at least partially based on the combination of: (i) a first computer-implemented model which relates glass composition to at least one property of the glass article after an ion-exchange process; and (ii) a second computer-implemented model which relates glass composition to at least one glass property which affects a glass manufacturing process.

In accordance with a third aspect, a method is disclosed for ion-exchange strengthening of a glass article using a molten salt bath comprising selecting at least one of the duration of the ion-exchange process, the temperature of the salt bath, and the composition of the molten salt bath based at least in part on the combination of: (i) a first computer-implemented model which relates chemical depth of layer after ion-exchange to glass composition; and (ii) a second computer-implemented model which relates maximum surface compressive stress after ion-exchange to glass composition.

In accordance with a fourth aspect, a computer-implemented method is disclosed for predicting/estimating chemical depth of layer and maximum surface compressive stress of a silica-containing glass after an ion-exchange process where the method includes using a computer to evaluate (i) a first set of equations that relates chemical depth of layer to glass composition x, temperature T, and time t, and (ii) a second set of equations that relates maximum surface compressive stress to glass composition x, temperature T, and time t, where $x=\{x_1, x_2 \ldots x_i \ldots x_N\}$ are concentrations of the glass's ion-exchange affecting components other than silica, T is the temperature of the ion-exchange process, and t is the duration of the ion-exchange process.

In accordance with a fifth aspect, a computer-implemented method is disclosed for predicting/estimating a liquidus temperature $T_{liquidus}$ of an ion-exchangeable glass where the method includes evaluating an equation of the form:

$$T_{liquidus} = T_{lo} + k_1 X + k_2 X^2$$

where $$X = R_2O - Al_2O_3 - MgO$$

where $Al_2O_3$ is the mole percent of alumina in the glass, MgO is the mole percent of magnesium oxide in the glass, $R_2O$ is the sum of mole percents of the alkali oxides in the glass, and $T_{l0}$, $k_1$, and $k_2$ are fitting parameters.

In accordance with a sixth aspect, a computer-implemented method is disclosed for predicting/estimating a zircon breakdown temperature $T_{brkdwn}$ of an ion-exchangeable glass where the method includes evaluating an equation of the form:

$$T_{brkdwn} = T_{b0} + \Sigma x_i Z_i$$

where the $x_i$ are concentrations in mole percent of the oxide components of the glass except for silica and $T_{b0}$ and the $Z_i$'s are fitting parameters.

Apparatus for practicing the above methods, specifically, programmed computers and computer readable storage media, is also disclosed.

With regard to the ion-exchange affecting components of a glass composition, it should be noted that those components can include clusters of constituents and/or constituents that might in some contexts be considered contaminants, e.g., water which would be considered a contaminant in, for example, glasses used in optical waveguide fibers. In many cases, the basic constituents of the glass will be oxides, it being understood that the technology disclosed herein can also be used with non-oxide glasses if desired. As to units, the composition can be expressed in any convenient units, mole percent and weight percent being the most common choices.

The above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

A. Introduction

Figure 1:
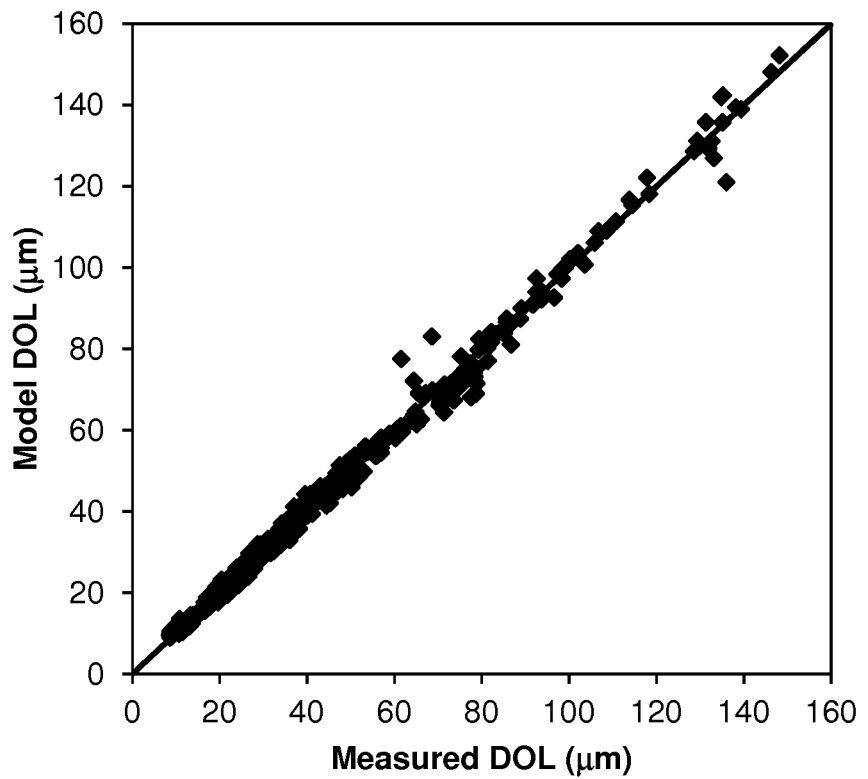
FIG. 1 is a plot of DOL values obtained using the DOL model disclosed herein (vertical axis) versus measured DOL values (horizontal axis) for the same glass compositions. Results are shown for 29 different glass compositions using various time and temperature conditions for the ion-exchange process.

As discussed above, the process of identifying suitable composition for ion-exchangeable glasses is complicated and challenging because of the numerous competing demands placed upon the composition. Among other things, the batch composition affects: (1) the mutual diffusivity of the ions being exchanged during the ion-exchange process; (2) the lattice dilation coefficient, i.e., the amount of installed strain per unit of ions exchanged; (3) the Young's modulus of the glass, which governs the conversion of installed strain to surface compressive stress; and (4) the relaxation of compressive stress as the ion exchange process takes place.

The above considerations relate directly to the DOL and CS values achieved for the glass article during the ion-exchange process. In addition to these effects, the glass composition needs to be compatible with the manufacturing process used to make the glass article. For example, in the case of glass articles in the form of glass sheets, it is desirable for the glass composition to be compatible with at least one of the two commercially-used sheet manufacturing processes, i.e., the float process and the overflow downdraw fusion process (hereinafter referred to as the "fusion process").

In the case of the float process, a glass ribbon is formed on the surface of a molten tin bath and after being removed from the bath is passed through an annealing lehr before being cut into individual sheets. For this process, the glass composition needs to be chemically compatible with the tin bath (as well as with the melting, fining, and conditioning apparatus used upstream of the bath) and must have a viscosity-versus-temperature profile suitable for delivery to the bath and solidification on the bath without the formation of, for example, crystalline defects.

In the case of the fusion process, a glass ribbon is formed by passing molten glass around the outside of a forming structure (known in the art as an "isopipe") to produce two layers of glass that fuse together at the bottom of the forming structure (the root of the isopipe) to form the glass ribbon. The glass ribbon is pulled away from the isopipe by pulling rollers and cooled as it moves vertically downward through a temperature-controlled housing. At, for example, the bottom of the housing (bottom of the draw), individual glass sheets are cut from the ribbon. Glass compositions suitable for use with the fusion process need to have viscosity-versus-temperature profiles which allow the glass to flow over the isopipe in a controlled manner without substantial devitrification. The compositions also need to be compatible with the materials making up the isopipe, e.g., zircon which can undergo breakdown at elevated temperatures when in contact with alkali-containing glasses.

Besides the factors relating to manufacturing, the glass composition desirably takes into account the particulars of the ion exchange process. For example, in addition to batch composition, the final maximum surface compressive stress and chemical depth of layer after the ion-exchange process can depend on several other factors, including: (1) salt bath temperature; (2) salt bath composition and degree of "poisoning"; (3) ion-exchange time; (4) thermal history of the glass, e.g., annealed version fusion-drawn glass; and (5) dimensions (thickness) of the glass article.

With the foregoing as background, we now turn to a discussion of the computer-implemented models disclosed herein. For purposes of illustration, an embodiment of the models is discussed which identifies glass compositions and ion-exchange conditions which maximize calculated compressive stress of the glass for a specified depth of layer. It is to be understood that the computer-implemented models can be used to achieve other end points, e.g., to minimize ion-exchange time for specified CS and DOL values.

We begin with discussions of two central components of the overall model, namely, the computer-implemented model for chemical depth of layer DOL and the computer-implemented model for maximum surface compressive stress CS (referred to hereinafter as the DOL/CS models). In each case, the model is based on physical principles and thus its fitting coefficients are different from those that would be obtained by performing a classical regression analysis of DOL and CS values versus component concentrations. Importantly, by using physical principles to create the model, the model's predictive abilities are superior to those that would result from a classical regression analysis performed on the same data.

B. Computer-Implemented Model for Chemical Depth of Layer

The computer-implemented model for chemical DOL is best explained in several steps. DOL as reckoned by optical measurement (using, for example, an Orihara FSM stress meter) is related to mutual diffusivity D and ion exchange time t by the relation:

$$DOL = \alpha \cdot 2\sqrt{Dt} \quad (1)$$

where $\alpha$ is a fitting parameter with a value of about 1.4.

The mutual diffusivity has a temperature and time dependence, as well as a composition dependence. Specifically, mutual diffusivity can be written in temperature and time dependent form as:

$$D(T, t) = \left(D_\infty e^{-\left(\frac{\Delta H}{k_B T}\right)}\right)\left(\frac{D_0}{D_\infty}\right)^{\exp\left(-\frac{t}{\tau}\right)} \quad (2)$$

The structure of Eq. (2) is discussed below. In terms of its variables, constants, and fitting parameters, T is temperature in degrees Kelvin, e.g., the temperature of the salt bath during ion-exchange strengthening, and $k_B$ is Boltzmann's constant. The fitting parameter $D_\infty$ is a prefactor of the diffusivity for infinite time (i.e. an equilibrium value for the prefactor), while $D_0$ (which may be used as a fitting parameter if desired; see below) represents an initial value for the prefactor. The ratio $\Delta H/k_B$ (another fitting parameter) is an activation temperature associated with the temperature dependence of mutual diffusivity. Finally, the fitting parameter $\tau$ is a relaxation time giving the time dependence of diffusivity. In principle it could be temperature dependent but comparison with data shows negligible temperature dependence.

Any of the above fitting parameters may in principle depend on glass composition, but comparison with data suggests that only the diffusivity prefactor $D_\infty$ (and $D_0$ which can have the same dependence) depends on composition. Its composition dependence may be approximated by:

$$D_\infty = d_0 + \Sigma x_i d_i \quad (3)$$

where the $x_i$'s are the mole percents of the oxide components of the glass other than $SiO_2$, and $d_0$ and the $d_i$'s are fitting parameters. As noted above and discussed in more detail below, $D_0$ can be given exactly the same composition dependence as $D_\infty$ so the ratio ($D_0/D_\infty$) is a single fitting constant, independent of composition, as is the relaxation time $\tau$. The activation barrier $\Delta H/k_B$ is also found to be independent of composition.

Examining the structure of Eq. (2), it can be seen that one important limiting value of this equation is:

$$D(T, t = 0) = D_0 e^{-\left(\frac{\Delta H}{k_B T}\right)} \quad (4)$$

which is calculated by evaluating Eq. (2) at t=0. Another important limit is obtained when t=∞:

$$D(T, t = \infty) = D_\infty e^{-\left(\frac{\Delta H}{k_B T}\right)}. \quad (5)$$

These relations show why the notation $D_0$ and $D_\infty$ is used in Eq. (2). The exponential used as an exponent in Eq. (2) arises in order to satisfy the relation $$\ln D = \ln D_\infty + (\ln D_0 - \ln D_\infty)\exp\left(-\frac{t}{\tau}\right) - \frac{\Delta H}{k_B T}. \quad (6)$$

The exponential is now seen to bring ln D smoothly from its initial value of ln $D_0$ at t=0 to its limiting value of ln $D_\infty$ at t=∞ while the temperature-dependence is accommodated by the final term in Eq. (6). This exponentially falling value of ln D from its initial to its final value is succinctly expressed through the structure of Eq. (2).

From Eqs. (4) and (5), it can be seen that $D_0$ and $D_\infty$ as used in Eq. (2) share a common temperature dependence. In principle, each limit of the diffusivity could have had its own separate temperature dependence. However, it was found that such separate temperature dependences do not help and are a waste of additional parameters. Also, it was found that $D_0$ and $D_\infty$ similarly share a common dependence on composition. To be precise, this means that whatever the composition-dependent expansion for $D_\infty$, $D_0$ has the same expansion except for an overall constant factor. Expressing these relationships in equation form, we have:

$$D_\infty = d_0 + \Sigma x_i d_i \quad (7)$$

and $$D_0 = C(d_0 + \Sigma x_i d_i) \quad (8)$$

where C is a constant that is independent of composition. This also implies that:

$$C = D_0/D_\infty. \quad (9)$$

We can use this simplification to rewrite Eq. (2) in the form:

$$D(T, t) = \left(D_\infty e^{-\left(\frac{\Delta H}{k_B T}\right)}\right)(C)^{\exp\left(-\frac{t}{\tau}\right)} \quad (10)$$
$$= \left(d_0 + \sum x_i d_i\right) e^{-\left(\frac{\Delta H}{k_B T}\right)} C^{\exp\left(-\frac{t}{\tau}\right)}.$$

Here C is the same composition-independent constant of Eq. (9) and all composition dependence is accommodated by the expansion for $D_\infty$. We could have written out Eq. (2) using both expansions of Eq. (7) and Eq. (8) but the expansion would divide out from the ratio of $D_0$ to $D_\infty$ and we would be left with Eq. (10). We are free to consider either $D_0$ or C to be fitting parameters, as they are related by Eq. (9). In this formulation, $D_\infty$ is always a fitting parameter. Having the initial and final values of diffusivity share a common composition dependence has been found to work well and avoids useless and potentially confusing additional fitting parameters, thus simplifying the modeling process.

When Eq. (2) is inserted into Eq. (1) we have a prediction for DOL based on the named fitting parameters. A comparison of predicted and measured DOL values using this model is given in FIG. 1. The data plotted in this figure includes measurements at a variety of temperatures and times, as well as for a variety of compositions. As is evident, the model corresponds closely to the experimental data.

C. Computer-Implemented Model for Maximum Surface Compressive Stress

The model for CS involves several physical effects. The concentration profile giving rise to the DOL described above has an overall scale or surface concentration that can depend on glass composition, process temperature, thermal history, and salt bath composition ("poisoning"). The conversion from concentration to strain involves a lattice dilation coefficient. The conversion from strain to stress involves Young's modulus and the Poisson ratio, and also can involve stress relaxation. The rate of stress relaxation is temperature dependent and can be composition dependent and thermal history dependent.

Any of these effects can be modeled more or less accurately with trade-offs between model complexity and accuracy, where increasing complexity can involve too many parameters for convenient or accurate work with a reasonable amount of experimentation. Part of the goal of the present disclosure is to achieve a high level of predictive power with a reasonable amount of supporting experimental work. The model for CS is therefore simplified as much as possible consistent with adequate predictive power. It will, of course, be understood that more complex models can be used if desired and that the modeling parameters can be derived from alternative physical principles than those used in the exemplary embodiment disclosed herein. These considerations also apply to the DOL model discussed above.

As in the DOL model, the CS model will be developed in individual steps. First, four quantities (i.e., (1) initial stress scale $S_0$, (2) temperature dependence of initial stress scale, (3) stress relaxation time $\tau_S$, and (4) the activation barrier $\Delta H_{\tau_S}/k_B$) will be expressed as linear combinations of mole % oxides.

The initial stress scale $S_0$ is established at a nominal temperature such as 410° C. This is the value that the stress would have after a process run at 410° C. in the limit of zero time. As such, it excludes the effects of force balance and stress relaxation, as well as salt bath purity (it assumes a nominal salt bath purity). It lumps together the influences of lattice dilation coefficient, surface concentration, Young's modulus, and Poisson ratio. This initial stress scale is reasonably represented by the expression:

$$S_0^{410} = s_0 + \Sigma x_i s_i \quad (11)$$

where the $x_i$'s are the mole percents of the oxide components of the glass other than $SiO_2$, and $s_0$ and the $s_i$'s are fitting parameters.

The temperature dependence of the initial stress scale $S_0$ was found to be reasonably linear in temperature and thus can be given by:

$$S_0(T) = S_0^{410} + \frac{dS}{dT}(T - 410° \text{ C.}) \quad (12)$$

where $S_0^{410}$ is as given above and $dS/dT$ is an additional fitting parameter that accounts for the temperature dependence of the initial stress scale. This temperature dependence is itself composition dependent so we have:

$$\frac{dS}{dT} = c_0 + \sum x_i c_i \quad (13)$$

where the $x_i$'s are the mole percents of the oxide components of the glass except for $SiO_2$, and $c_0$ and the $c_i$ are fitting parameters. Eqs. (11), (12), and (13) together define the composition and temperature dependence of the initial stress scale.

The stress relaxation time $\tau_S$ has both temperature and composition dependence. The temperature dependence can be represented as:

$$\tau_S = \tau_S^0 \exp\left(\frac{\Delta H_{\tau_S}}{k_B T}\right) \quad (14)$$

where $\tau_s^0$ is a stress relaxation prefactor and the ratio $\Delta H_{\tau_S}/k_B$ is an activation barrier associated with the temperature dependence of the stress relaxation time. The composition dependence of the prefactor can be expressed as $$\tau_S^0 = \tau_{S0}^0 + \Sigma x_i \tau_{Si}^0. \quad (15)$$

where again, the $x_i$'s are the mole percents of the oxide components of the glass other than $SiO_2$, and the $\tau_{S0}^0$ and $\tau_{Si}^0$'s are fitting parameters. The composition dependence of the activation barrier is similarly expressed as:

$$\frac{\Delta H_{\tau_S}}{k_B} = h_0 + \sum x_i h_i \quad (16)$$

where once again, the $x_i$'s are the mole percents of the oxide components of the glass other than $SiO_2$ and the $h_0$ and $h_i$'s are fitting parameters. Taken together Eqs. (14), (15), and (16) give the full composition dependence and temperature dependence of the stress relaxation time $\tau_S$. This quantity will be used later in the full description of CS.

The penultimate step in defining a model for CS is to consider CS without accounting for the role of force balance. This is equivalent to finding the CS for an infinitely thick sample. Using the quantities defined above, this uncorrected stress is given by:

$$CS^{uncorrected} = S_0 \exp\left(-\frac{t}{\tau_S}\right). \quad (17)$$

Here t is the ion exchange time, and $S_0(T)$ and $\tau_S$ are as defined above and thus each includes both a temperature and a composition dependence as described above.

Finally, the full model for surface compressive stress CS, including the effect of force balance, is given by:

$$CS = CS^{uncorrected}\left(1 - \frac{2 \cdot DOL}{\sqrt{\pi} \, \alpha L}\right). \quad (18)$$

Here L is the thickness of the sample, DOL is the chemical depth of layer discussed above, $\alpha$ is the parameter of Eq. (1) which is about 1.4, and $CS^{uncorrected}$ from Eq. (17) takes into account composition dependence, ion exchange time dependence, and ion exchange temperature dependence. The factors in Eq. (18) that account for force balance are derived by integrating the erfc-shaped concentration profile including the mutual diffusivity, ion exchange time, and other factors noted above.

Figure 2:
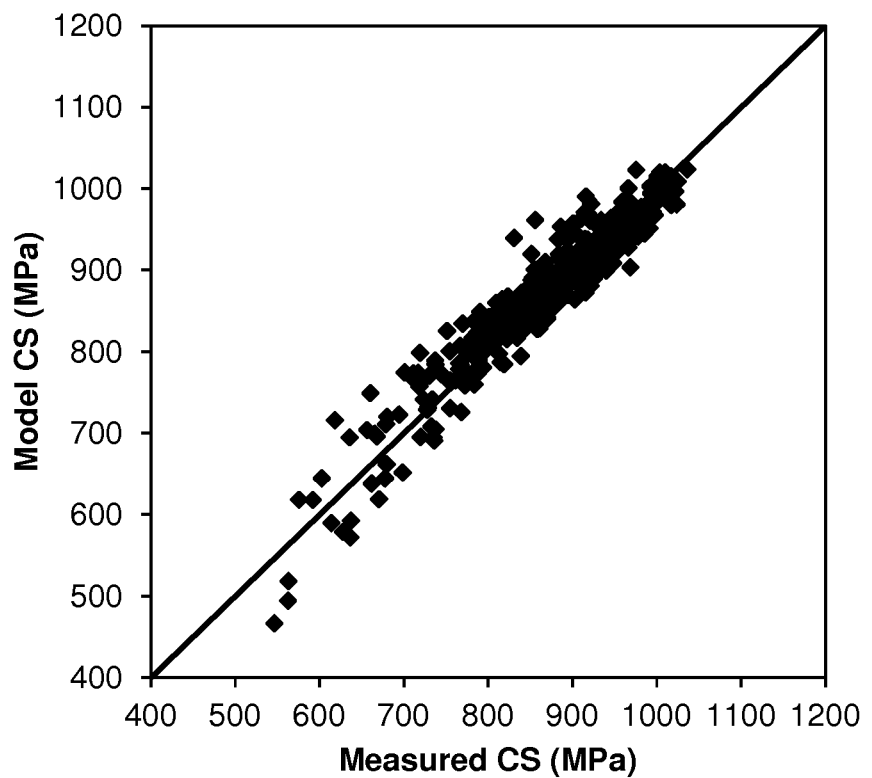
FIG. 2 is a plot of CS values obtained using the CS model disclosed herein (vertical axis) versus measured CS values (horizontal axis) for the same glass compositions. The measured values were obtained from measured values of both refractive index and stress optic coefficient. Results are shown for 29 different glass compositions using various time and temperature conditions for the ion-exchange process.

A comparison of predicted and measured CS values using the above model is given in FIG. 2. The data plotted in this figure includes measurements at a variety of temperatures and times, as well as for a variety of compositions. As is evident, the model corresponds closely to the experimental data.

As a non-limiting example, DOL/CS models of the type disclosed above can be used by a glass designer/developer to specify a target DOL and use its value to determine an ion exchange time according to Eq. (1) and then use the same DOL in Eq. (18). As another non-limiting example, the DOL/CS models can be used to calculate the surface compressive stress of a glass composition for a specified depth of layer for a given ion-exchange temperature and glass thickness. Other combinations of dependent and independent variables can also be used depending on the goals to be achieved. For example, the dependent variables can be $x_i$ values that will achieve a desired CS/DOL combination for a desired ion exchange time. Other applications for the above models and variations thereof will be evident to persons skilled in the art from the present disclosure.

The above models do not explicitly include the dependence of CS and/or DOL on the thermal history of the glass or on the salt bath concentration. If desired, thermal history dependence can be introduced into the model by performing the fitting for glasses having different thermal histories and thus different fictive temperatures.

As to the effects of salt bath composition, those effects can be taken into account using, for example, techniques of the type described in R. J. Araujo, S. Likitvanichkul, Y. Thibault, and D. C. Allan, "Ion exchange equilibria between glass and molten salts", *Journal of Non-Crystalline Solids* 318 (2003) 262-267, the content of which is incorporated herein in its entirety by reference. The model of this reference has been found to account for the variation of surface concentration after ion exchange with variation in salt bath purity.

The effects of salt bath composition can be introduced in the above equations by adjusting the mole percent values ($x_i$ values) to reflect the fact that in addition to potassium ions, the salt bath normally contains sodium ions. For example, commercial $KNO_3$ solutions typically contain 0.2 to 0.6 wt. % $NaNO_3$. In one embodiment, the following procedures can be used to convert from wt. % $NaNO_3$ in a salt bath to wt. % $K_2O$ at the surface of a glass sample under ion exchange conditions based on the two-parameter model of the above Araujo et al. article. In the analysis that follows, it is assumed that reactions in which Na or K quantities depart from perfect 1/1 replacement can be ignored.

The first equation used in the analysis relates mole fraction of K in the glass to the ratio of mole fractions of K and Na in the salt bath and is of the form:

$$X_K^{glass} = \frac{1}{2}\left(1 \pm \sqrt{1 - \frac{R-1}{Rp-1}}\right) \quad (19)$$

where $$R = \left(\frac{K'-1}{K'+1}\right)^2, \quad (20)$$

$$K' = K_{eq} \frac{X_{Na}^{bath}}{X_K^{bath}}, \quad (21)$$

and $$p = 1 - \exp\left(\frac{\varepsilon}{kT}\right), \quad (22)$$

where $X_K^{glass}$ is the fraction of K (relative to K+Na) in the glass, $X_K^{bath}$ is the same thing for the bath, and $X_{Na}^{bath}$ is the fraction of Na in the bath.

By definition, $$X_K^{bath} + X_{Na}^{bath} = 1 \quad (23)$$

and $$X_K^{glass} + X_{Na}^{glass} = 1. \quad (24)$$

The two parameters of the model can be taken to be $\varepsilon/k$ and $K_{eq}$, and values for these parameters can be obtained by fitting values for wt. % $K_2O$ in the glass to values for wt. % $NaNO_3$ in the bath. In particular, model fitting involves fitting $\varepsilon/k$ and $K_{eq}$ to surface concentration data as a function of salt bath poisoning. Representative values for the parameters are: $\varepsilon/k = -1170.21$ Kelvin and $K_{eq} = 3.172$. Note that negative $\varepsilon$ in this context means unlike ions are attracted to each other more than like ions in the glass.

If desired, the effects of temperature on surface concentration can be included by, for example, rescaling the surface concentration at a fixed salt bath purity by an additional factor that varies linearly with temperature. Using measured data for surface concentration (for example, microprobe data) from salt baths of the same purity but different temperatures, the fitting coefficients of a linear temperature dependence can be adjusted to agree with measured data. This allows both salt purity dependence and temperature dependence to be accounted for simultaneously. Note that the temperature dependence of the stress scale described in Eq. (12) and Eq. (13) offers a redundant accounting of the effect of temperature, since the surface concentration variation also contributes directly to the overall stress scale, so in practice it is convenient to ignore explicit temperature variation in the surface concentration while lumping it into the overall stress scale S.

Fitted weight percent data can be transformed to mole proportion values using the following conversion procedures. To begin with, the weight percent of $NaNO_3$ in the bath $w_{NaNO_3}^{bath}$ can be written:

$$w_{NaNO_3}^{bath} = 100 \frac{X_{Na}^{bath} W_{NaNO_3}}{X_{Na}^{bath} W_{NaNO_3} + X_{K}^{bath} W_{KNO_3}} \quad (25)$$

where the W's represent the molecular weights of the subscript species. This assumes there is only $NaNO_3$ and $KNO_3$ in the salt bath or that only those masses need be considered.

Using the sum rules, we write everything in terms of $X_K^{bath}$ in the form:

$$w_{NaNO_3}^{bath} = 100 \frac{(1 - X_K^{bath}) W_{NaNO_3}}{(1 - X_K^{bath}) W_{NaNO_3} + X_K^{bath} W_{KNO_3}}. \quad (26)$$

This expression can be inverted to give the following expression, which is generally useful for converting measured values of wt % $NaNO_3$ to $X_K^{bath}$ values:

$$X_K^{bath} = \frac{1 - \frac{w_{NaNO_3}^{bath}}{100}}{1 + \frac{w_{NaNO_3}^{bath}}{100} \left( \frac{W_K - W_{Na}}{W_{NaNO_3}} \right)}. \quad (27)$$

Similar relations govern wt. % $K_2O$ in the glass and $X_K^{glass}$, except we need to take account of all the other atoms in the glass. The conversion from $X_K^{glass}$ to wt. % $K_2O$ at the glass surface is achieved by calculating the maximum possible wt. % $K_2O$ that would correspond with replacing all $Na_2O$ in the base glass by $K_2O$. If the fraction f of $Na_2O$ and $K_2O$ (by mole) were known then the desired maximum would be given by:

$$w_{K_2O}^{glass,max} = 100 \frac{f W_{K_2O}}{f W_{K_2O} + W_p} \quad (28)$$

where $W_p$ represents the molecular weight of the base glass absent the $Na_2O$ and $K_2O$, and is given by:

$$W_p = W_{glass} - x'_{Na_2O} W_{Na_2O} - x'_{K_2O} W_{K_2O} \quad (29)$$

where $W_{glass}$ is i the molecular weight of the base glass and $x'_{Na_2O}$, $x'_{K_2O}$ are mole fractions (mole percents).

Given $w_{K_2O}^{glass,max}$ we have $$w_{K_2O}^{glass} = w_{K_2O}^{glass,max} \cdot X_{K_2O}^{glass} \quad (30)$$

which will convert a model-calculated value of $X_{K_2O}^{glass}$ into a surface concentration of $K_2O$ in wt %.

To get the mole fraction (mole percent) of $K_2O$ at the surface of the glass instead of the wt % value of Eq. (30) we need $$x_{K_2O}^{glass} = f \cdot X_{K_2O}^{glass}. \quad (31)$$

To use the above expressions, we need to find the fraction f of $Na_2O$ plus $K_2O$ by mole. If the mole fractions (mole percents) of $Na_2O$ and $K_2O$ in the base glass are already known, then the answer is:

$$f_{Na+K} = x'_{Na_2O} + x'_{K_2O} \quad (32)$$

where the $x'_s$ are mole fractions, not relative proportions (the $X_s^{glass}$ are relative proportions).

If instead, we have wt. % oxide components for the base glass composition then all components need to be converted to mole fractions. The conversion from wt. % to mole fraction (mole percent) can be written:

$$x'_s = \frac{\frac{w_s}{W_s}}{\sum_{i=1}^{N} \frac{w_i}{W_i}} \quad (33)$$

where $x'_s$ s is the mole fraction of species s, $w_s$ is the wt. % of species s, $W_s$ is the molecular weight of species s, and the sum in the denominator is over all species in the base glass composition.

Note that the molecular weight of the glass is:

$$M_{glass} = \frac{100}{\sum_{i=1}^{N} \frac{w_i}{W_i}} \quad (34)$$

which allows us to write Eq. (33) in the form:

$$x'_s = \frac{1}{100} \frac{w_s}{W_s} M_{glass}. \quad (35)$$

Note that in using these procedures, it is not necessary to keep track of the full base glass composition as long as one has $w_{K_2O}^{glass,max}$ for each glass of interest and also the molecular weights of K and Na atoms. To get $w_{K_2O}^{glass,max}$ for each glass, one needs to work with the full glass composition and perform the calculations described above.

Using procedures of the type described above, the mole percent values used in the DOL/CS models can be adjusted to take account of the composition of the salt bath. However, in general, salt bath purity is a secondary, rather than a primary, effect. For example, the predicted DOL and CS values of FIGS. 1 and 2 do not include the effects of variations in salt bath purity.

D. Computer-Implemented Models Relating to Manufacturability

As discussed above, in addition to employing computer-implemented DOL/CS models, in certain embodiments, the overall computer-implemented model also models the effects of the glass's composition on the manufacturability of the glass. The following sections include non-limiting illustrations of the use of computer-implemented models which relate composition to (1) the temperature dependence of glass viscosity (specifically, equilibrium viscosity), (2) liquidus temperature, and (3) zircon breakdown temperature. It is to be understood that not all of these "manufacturability" models need be used for any particular application of the DOL/CS models. Likewise, computer-implemented models for one or more other composition-dependent properties may be used depending on the particulars of the ion-exchangeable glass, its method of manufacture, and/or its use. Also, the computer-implemented models for liquidus temperature and zircon breakdown temperature for ion-exchangeable glasses need not be used with the DOL/CS models, but can be used independently if desired.

Whenever additional models are combined with the DOL/CS models, a competition can arise between the models in identifying batch compositions. In practice, it has been found that such competitions can be dealt with effectively by treating the additional models as constraints on the DOL/CS models during the optimization process for finding batch compositions. Commercially available optimizers, e.g., the optimizer of the EXCEL software package, allow constraints to be included in the optimization process. For example, limits can be set on the values of, for example, liquidus temperature (or, equivalently, liquidus viscosity), melting temperature, zircon breakdown temperature (or, equivalently, zircon breakdown viscosity), time to reach a particular DOL, etc., and as the optimizer seeks a batch composition which is predicted to meet the DOL/CS requirements, the limits on the other values will constrain the solution provided by the optimizer to batch compositions which do not exceed the limits of the constraints. In practice, this constraint approach has been found to work successfully in combining the "desires" of multiple models.

In terms of glass manufacture, the viscosity-versus-temperature profile of a glass composition is important throughout the process, beginning with melting and continuing through forming. Thus, it is desirable to reduce the melting temperature to reduce energy costs and equipment degradation during the melting process. As to forming, commercial forming processes, e.g., the fusion and float processes, have well-defined viscosity operating windows in which the processes are stable and well-controlled. The intermediate steps between melting and forming, e.g., fining and conditioning, likewise have viscosity operating windows in which these steps are best performed.

Commonly-assigned U.S. application Ser. No. 12/896,355, entitled "Methods and Apparatus for Predicting Glass Properties," which was filed on Oct. 1, 2010, the content of which is incorporated herein in its entirety by reference, discloses models for predicting viscosity-versus-temperature profiles as a function of batch compositions that can be used with the DOL/CS models of the present disclosure. In outline, that application discloses a method for determining a relationship between temperature T and viscosity η for a material that (i) is a glass or glass-forming liquid and (ii) includes N viscosity-affecting components, which includes the steps of:

(a) measuring the viscosity of a plurality of reference materials at a plurality of temperatures; and (b) using a programmed computer, fitting a function of the form $$\log_{10}\eta(T,x)=C_1+C_2\cdot(f_1(x,FC1)/T)\cdot\exp([f_2(x,FC2)-1]\cdot[f_1(x,FC1)/T-1]) \quad (36)$$

to the measured viscosities of step (a) to determine values for FC1 and FC2, where in said function:

(i) $C_1$ and $C_2$ are constants, (ii) $x=\{x_1, x_2, \ldots x_i \ldots x_N\}$ are the concentrations of the N viscosity-affecting components, (iii) $FC1=\{FC^1_1, FC^1_2 \ldots FC^1_i \ldots FC^1_N\}$ is a first set of temperature-independent coefficients, one coefficient for each of the N viscosity-affecting components, and (iv) $FC2=\{FC^2_1, FC^2_2 \ldots FC^2_i \ldots FC^2_N\}$ is a second set of temperature-independent coefficients, one coefficient for each of the N viscosity-affecting components, where the function and the values for FC1 and FC2 determined in step (b) constitute the relationship between viscosity and temperature for the material. Further details regarding this method for predicting viscosity-versus-temperature profiles can be found in the above-referenced application. Other viscosity-versus-temperature models can, of course, be used in the practice of the present disclosure if desired.

Figure 3:
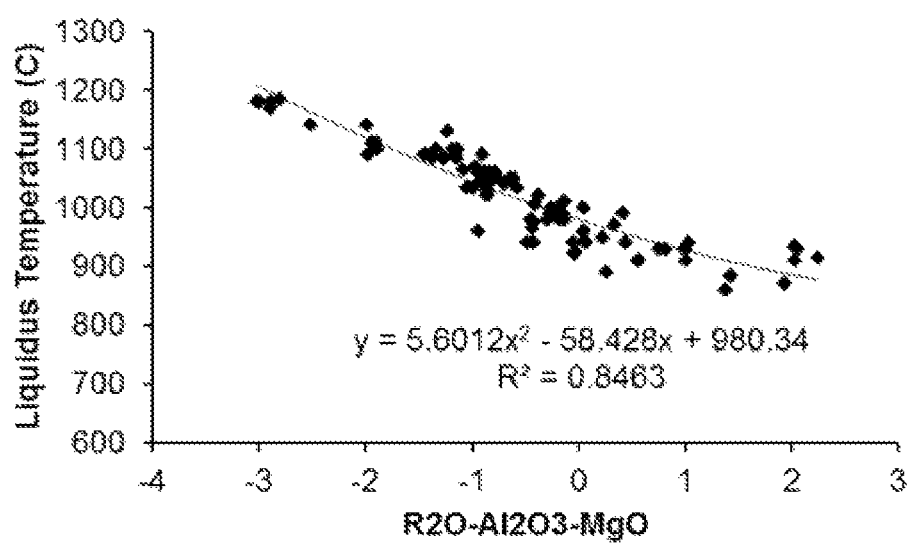
FIG. 3 is a plot of measured liquidus temperature in ° C. (vertical axis) versus the function $R_2O$—$Al_2O_3$—MgO (horizontal axis) for various ion-exchangeable glass compositions of the type suitable for use as faceplates for electronic devices. As shown, the model predictions are a quadratic function of $R_2O$ concentration minus the $Al_2O_3$ plus MgO concentrations of the glass, where the concentrations are in mole %.

In addition to a glass's viscosity-versus-temperature profile, the temperature at which a glass begins to crystallize, i.e., its liquidus temperature, is also an important property of a glass composition, especially in the case of glass articles which need to have extremely low levels of defects. In accordance with the present disclosure, it has been found that the liquidus temperatures of ion-exchangeable glasses can be modeled by an equation of the form:

$$T_{liquidus}=T_{l0}+k_1 X+k_2 X^2 \quad (37)$$

with the definition $$X=R_2O-Al_2O_3-MgO \quad (38)$$

where each symbol represents a mole % of that component in the glass and $R_2O$ means the sum of alkali oxides (such as $Na_2O$ plus $K_2O$). The parameters $T_{l0}$, $k_1$, and $k_2$ are fitting parameters chosen to optimize agreement with measured liquidus temperatures over a range of experimental data. An example of measured data and model prediction is shown in FIG. 3.

Using a viscosity-versus-profile, e.g., a profile based on Eq. (36) above, a liquidus temperature predicted by Eq. (37) can be converted into a liquidus viscosity. The liquidus viscosity can then be compared with the forming viscosity, e.g., the viscosity of the glass as supplied to an isopipe in a fusion process, and a determination made as to whether the glass's liquidus viscosity is sufficiently high to be successfully formed without unacceptable levels of devitrification defects. In terms of an overall optimization procedure, the liquidus viscosity (or liquidus temperature) can be used as a constraint in predicting batch compositions that will have desired DOL and CS values.

Figure 4:
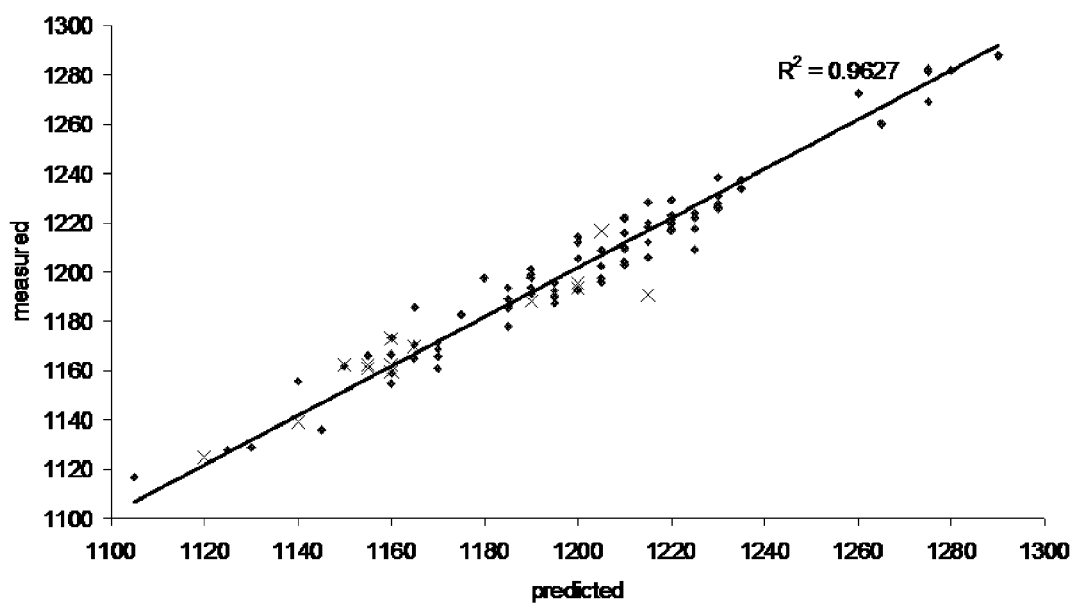
FIG. 4 is a plot of predicted zircon breakdown temperature obtained using the model disclosed herein (horizontal axis in ° C.) versus measured zircon breakdown temperature (vertical axis in ° C.) obtained using XRF (diamond data points) or wet chemistry ("x" data points). Results are shown for 86 glass compositions.

As noted above, the fusion process is often practiced using isopipes composed of zircon, and zircon has been found to degrade at elevated temperatures when in contact with alkali-containing glasses. In accordance with the present disclosure, it has been determined that the zircon breakdown temperatures of ion-exchangeable glasses, i.e., the temperature at which more than 0.01 zirconia defects per pound of glass is observed at the fusion line of glass sheets made by the fusion process, can be modeled by an equation of the form:

$$T_{brkdwn}=T_{b0}+\Sigma x_i Z_i \quad (39)$$

where the symbols $x_i$ are mole % oxide components except $SiO_2$. The parameters $T_{b0}$ (the intercept) and $Z_i$ are fitting parameters chosen to optimize agreement with measured zircon breakdown temperatures over a range of experimental data, e.g., a range where the viscosity of the glass composition is above the viscosity needed for successful forming with an isopipe. An example of measured data and model prediction is shown in FIG. 4.

From the foregoing, it can be seen that this disclosure permits the simultaneous application of multiple mathematical models for multiple properties of ion-exchangeable glasses for the purpose of improving the performance of those glasses. At a minimum, mathematical models for DOL and CS are normally used, but these models can be combined with other models, e.g., models relating to manufacturability.

Improving the performance of ion-exchanged glasses can be defined in different ways and often involves not only the final stress state of the ion-exchanged glass (e.g. the maximum surface compression while maintaining desired frangibility and adequate case depth) but also the inherent fracture toughness of the glass and its manufacturability. As noted above, the latter can involve liquidus temperature, melting temperature (e.g., a melting temperature less than or equal to 1670° C.), and zircon breakdown temperature as examples. Importantly, the present disclosure is not limited to one or a few specific choices of mathematical model, but is "modular" in the sense that new and/or improved models can be incorporated for separate physical effects and become part of the overall modeling approach.

As one example of an application of the present disclosure, the input parameters to the modeling system can, for example, include glass composition, target depth of layer (DOL), salt bath temperature, and glass thickness. The calculated output values can include the required exchange time to reach the target depth of layer, the resulting compressive stress in the glass, the zircon breakdown temperature and viscosity, the liquidus temperature and viscosity, and the melting (200 poise) temperature.

As another example, rather than inputting a glass composition, the modeling system can be used to identify a composition having specific properties, e.g., a maximum compressive stress at a 50-micron depth of layer for a 410° C. bath in technical grade $KNO_3$, subject to a specified maximum zircon breakdown viscosity and a minimum liquidus viscosity. Often, the identified composition will be close to existing compositions, but will differ in its details. For example, using the models disclosed herein, it has been found that slightly higher $Al_2O_3$ and $Na_2O$ contents (e.g., on the order of 0.5 mole % in each case) can improve the initial compressive stress of a glass composition designed for use as a faceplate and slightly higher CaO (on the order of 0.1 mole %) can reduce the level of stress relaxation. These increases can be made at the expense of $SiO_2$. Predicted increases on the order of 40 MPa in compressive stress for the same depth of layer can be achieved by such relatively small changes in composition.

The mathematical procedures described above can be readily implemented using a variety of computer equipment and a variety of programming languages or mathematical computation packages such as MATHEMATICA (Wolfram Research, Champaign, Ill.), MATLAB (MathWorks of Natick, Mass.), or the like. Customized software can also be used. Output from the procedures can be in electronic and/or hard copy form, and can be displayed in a variety of formats, including in tabular and graphical form. For example, graphs of the types shown in FIGS. 1-4 can be prepared using commercially available data presentation software such as MICROSOFT's EXCEL program or similar programs. Software embodiments of the procedures described herein can be stored and/or distributed in a variety of forms, e.g., on a hard drive, diskette, CD, flash drive, etc. The software can operate on various computing platforms, including personal computers, workstations, mainframes, etc.

Without intending to limit it in any manner, the invention will be further illustrated by the following examples. Among other things, the examples illustrate representative applications of the technology disclosed herein to the selection of compositions for ion-exchangeable glasses. It should, of course, be understood that these particular examples are not limiting and the technology disclosed herein can be employed in a variety of ways to understand and/or to improve the design, manufacture and ion-exchange processing of ion-exchangeable glasses. For example, predictions based on the present disclosure can be used to guide experimental composition research, to pre-screen candidate glasses so as to reduce the number of compositions that need to be melted and/or ion-exchanged, and/or to reduce the number of measurements that need to be performed during the research process. Further applications for the technology disclosed herein will be evident to skilled persons from the present disclosure.

EXAMPLES

Table 1 sets forth the compositions of 7 glasses whose properties were predicted using the models described above. In particular, the DOL/CS models were used to predict DOL values for a 10 hour ion-exchange treatment at 410° C. in technical grade $KNO_3$, as well as CS values for a 50 micron final DOL. In addition, liquidus temperature, zircon breakdown temperature, and the viscosity of the glass at the zircon breakdown temperature were predicted using the above manufacturability models. The results of these calculations are set forth in Table 1. The effects of salt bath poisoning were not included in this study.

Based on the results shown in Table 1, Example 6 was selected as the composition having the overall best performance in terms of ion-exchange strengthening and manufacturability. Glass sheets composed of the glass of this example were successfully prepared using a fusion process and tested for DOL and CS after having been subjected to a 10 hour ion-exchange treatment at 410° C. in technical grade $KNO_3$. The measured values were 52 microns for DOL and 915 MPa for CS, in close agreement with the predicted values of Table 1. Importantly, this glass whose composition was selected based on properties predicted using the technology disclosed herein has both a greater DOL and a greater CS than existing commercial faceplate glasses. Improving both of these values is an impressive achievement since usually increasing one of the values means decreasing the other value.

From the foregoing, it can be seen that the advantages of the technology disclosed herein include, but are not limited to: (1) significant cost and time savings compared to a purely brute-force experimental approach; (2) better performance of the final glass article because glass compositions and ion-exchange conditions having improved performance can be more easily identified; and (3) the ability to select compositions and ion-exchange conditions based directly on compressive stress for a specified depth-of-layer, which is often the way in which users specify their requirements for chemically-strengthened glass articles.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

| Components (wt. %) | 1 | 2 | 3 | 4 | 5 | 6 | 7 |
|---|---|---|---|---|---|---|---|
| SiO2 | 65.19 | 64.706 | 64.83 | 64.83 | 64.85 | 64.93 | 64.81 |
| Al2O3 | 16.17 | 16.954 | 17.18 | 16.78 | 16.53 | 16.42 | 16.38 |
| Na2O | 14.8 | 14.409 | 14.19 | 14.39 | 14.76 | 14.77 | 14.91 |
| MgO | 3.29 | 3.421 | 3.08 | 3.21 | 3.37 | 3.39 | 3.36 |
| CaO | 0.07 | 0.039 | 0.273 | 0.22 | 0.04 | 0.05 | 0.09 |
| SnO2 | 0.43 | 0.403 | 0.4 | 0.4 | 0.4 | 0.4 | 0.4 |
| DOL/CS Models | | | | | | | |
| CS @ 50 μm | 900 | 935 | 935 | 920 | 917 | 913 | 911 |
| DOL @ 10 hours | 49.8 | 50.5 | 50.7 | 50.7 | 51.7 | 51.6 | 51.6 |
| Manufacturability Models | | | | | | | |
| liquidus T | 1034 | 1078 | 1071 | 1057 | 1042 | 1038 | 1028 |
| zircon breakdown T | 1208 | 1203 | 1206 | 1205 | 1199 | 1201 | 1196 |
| breakdown η | 2.7E+04 | 3.9E+04 | 4.1E+04 | 3.5E+04 | 3.2E+04 | 3.0E+04 | 3.0E+04 |

CS is in MPa; DOL is in μm; temperatures are in °C.; and η is in poise.

What is claimed is:

1. A method of making a glass article comprising:
   (I) melting batch materials to produce molten glass; and
   (II) forming a glass article from the molten glass;
   wherein:
   (A) the batch materials comprise a plurality of components that (i) affect the ion-exchange properties of the glass and (ii) become at least part of the glass of the glass article; and
   (B) the method is characterized by:
      (a) said ion-exchange affecting components and/or their concentrations in the glass of the glass article are at least partially based on computer-implemented modeling which comprises a combination of: (i) a first computer-implemented model which relates chemical depth of layer after ion-exchange to glass composition; and (ii) a second computer-implemented model which relates maximum surface compressive stress after ion-exchange to glass composition; and
      (b) said batch materials are selected to provide, in the glass of the formed glass articles, said ion-exchange affecting components and/or their concentrations that, at least in part, are based on said computer-implemented modeling;
   and wherein:
      the first computer-implemented model comprises a first set of equations that relates chemical depth of layer to glass composition x, temperature T, and time t, and
      the second computer-implemented model comprises a second set of equations that relates maximum surface compressive stress to glass composition x, temperature T, and time t,
   where:
      (i) $x = \{x_1, x_2, \ldots x_i \ldots x_N\}$ are concentrations of the glass's ion-exchange affecting components other than silica,
      (ii) T is the temperature of the ion-exchange process,
      (iii) t is the duration of the ion-exchange process, and
      (iv) the $x_i$'s comprise at least one component that is not subject to ion exchange.

2. The method of claim 1 wherein said computer-implemented modeling comprises an additional computer-implemented model for a property of the glass which affects its manufacturability.

3. The method of claim 2 wherein the property of the glass which affects its manufacturability is liquidus temperature and said computer-implemented modeling optionally comprises a computer-implemented model to convert liquidus temperature to liquidus viscosity.

4. The method of claim 2 wherein the property of the glass which affects its manufacturability is zircon breakdown temperature and said computer-implemented modeling optionally comprises a computer-implemented model to convert zircon breakdown temperature to zircon breakdown viscosity.

5. The method of claim 2 wherein the property of the glass which affects its manufacturability is melting temperature.

6. The method of claim 2 wherein the property of the glass which affects its manufacturability is at least one of liquidus temperature, zircon breakdown temperature, and melting temperature.

7. The method of claim 2 wherein the additional computer-implemented model comprises an equation for a liquidus temperature $T_{liquidus}$ of an ion-exchangeable glass of the form:

$$T_{liquidus} = T_{l0} + k_1 X + k_2 X^2$$

where $$X = R_2O - Al_2O_3 - MgO$$

where $Al_2O_3$ is the mole percent of alumina in the glass, MgO is the mole percent of magnesium oxide in the glass, $R_2O$ is the sum of mole percents of the alkali oxides in the glass, and $T_{l0}$, $k_1$, and $k_2$ are fitting parameters.

8. The method of claim 2 wherein the additional computer-implemented model comprises an equation for a zircon breakdown temperature $T_{brkdwn}$ of an ion-exchangeable glass of the form:

$$T_{brkdwn} = T_{b0} + \Sigma x_i Z_i$$

where the $x_i$'s are in mole percent and $T_{b0}$ and the $Z_i$'s are fitting parameters.

9. The method of claim 1 wherein the $x_i$'s comprise at least two of $Al_2O_3$, $Na_2O$, MgO and CaO.

10. The method of claim 1 further comprising ion-exchange strengthening the glass article using a molten salt bath wherein at least one of the duration of the ion-exchange process, the temperature of the salt bath, and the composition of the molten salt bath is selected based at least in part on said computer-implemented modeling.

11. The method of claim 1 wherein the second set of equations relate maximum surface compressive stress to glass thickness.

12. The method of claim 11 wherein the second computer-implemented model predicts/estimates the maximum surface compressive stress of a given glass composition for a specified chemical depth of layer for a given ion-exchange temperature and a given glass thickness.

13. The method of claim 1 wherein the first set of equations comprises an equation for mutual diffusivity which comprises a set of fitting parameters for the $x_i$'s.

14. The method of claim 1 wherein the second set of equations comprises an equation for the initial stress scale of the ion-exchange process as a function of temperature, said equation comprising two sets of fitting parameters for the $x_i$'s.

15. The method of claim 1 wherein the second set of equations comprises an equation for stress relaxation time which comprises two sets of fitting parameters for the $x_i$'s.

* * * * *